March 21, 1961   C. H. SCHLESMAN   2,976,380
RELAY DEVICE FOR CONTROLLING A SERVO MOTOR
Filed July 24, 1952
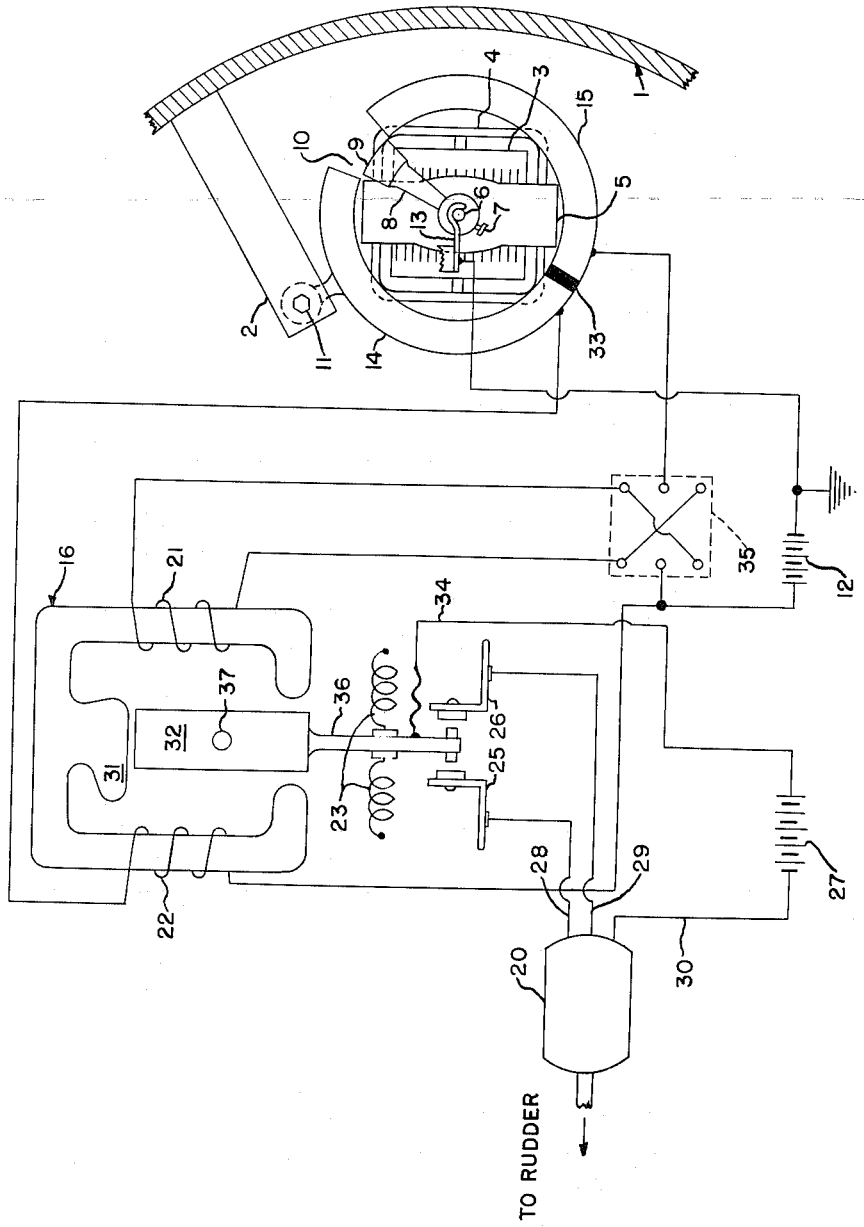
INVENTOR
C. H. SCHLESMAN
BY  G. D. O'Brien
    R. M. Hicks
ATTORNEYS United States Patent Office 2,976,380
Patented Mar. 21, 1961

2,976,380

RELAY DEVICE FOR CONTROLLING A SERVO MOTOR

Carleton H. Schlesman, Washington, D.C., assignor to the United States of America as represented by the Secretary of the Navy Filed July 24, 1952, Ser. No. 300,797

5 Claims. (Cl. 200—102)

(Granted under Title 35, U.S. Code (1952), sec. 266)

The invention described herein may be manufactured and used by or for the Government of the United States of America, for governmental purposes, without the payment of any royalties thereon or therefor.

This invention relates to control systems of the broad servo type and particularly to a system wherein a control device, which connects a main control element such as a rudder to a gyro mechanism, reverses the direction of travel of the main control element at frequent intervals, such as may be used to control the direction of travel or course of a torpedo or the direction of rotation of a gun turret. In controls of this type a dilemma arises from the fact that at one point in the cycle the control mechanism may attempt to go in both directions at the same time. For example, in a torpedo steering control system, a gyro mechanism originates steering orders from gyroscope bearing signals. When the torpedo is proceeding 180° from true course, the control system exhibits a dead spot and the torpedo may run in the opposite direction from that designated because in the manufacture of the mechanical elements a certain amount of backlash is inevitable and the control element may dwell on this dead spot. The possibility of a dead spot occurring in a control device as hereforth described is eliminated in the system of the instant invention which includes a novel relay construction for producing clockwise or counterclockwise rotation of a positioning motor, such as the rudder motor of a torpedo or the motive power for rotating a turret or other device which must be reversed in direction of travel. The device of the instant invention has the advantage over systems heretofore in use employing costly polarized relays in which additional windings on the relay coil are employed to provide magnetic unbalance to bias the relay, multi-branch magnetic circuits attaining unbalance by a combination of ampere turns, difference in pole face areas, pneumatic systems and use of additional gyros in that the relay in the system disclosed herein may be cut on or off at will and may be manufactured to ordinary tolerances and which eliminates the use of expedients as above to obtain a biasing effect.

In order to overcome the difficulties and disadvantages heretofore stated it is a primary object of the instant invention to provide a control device, forming a part of a servo type control system, which prevents the possibility of the control remaining on a dead spot position thus preventing operation of the controlled mechanism in either direction.

It is a further object of this invention to provide a control device to form a connection to a gyro element which permits manufacturing to ordinary tolerances and yet provides preferred direction steering from 180° positions.

It is a further object of this invention to provide a control device for a control mechanism including a novel magnetic relay structure for obtaining a preferred direction of operation of the controlled mechanism.

It is a further object of this invention to provide in a servo system a relay connecting a gyro device to the controlled mechanism which will always return the mechanism to the zero or null position by the shortest route, and a means of locking out this feature at will by an auxiliary contact.

It is a further object of this invention to provide a control device in a control system of torpedo pattern control capable of maintaining a torpedo on a predetermined course with multiple headings without the use of auxiliary gyro.

Other objects and many of the attendant advantages of this invention will be readily appreciated as the same becomes better understood by reference to the following detailed description when considered in connection with the accompanying drawing wherein the figure shows the components and their operating relation in a system for a course control mechanism embodying the features of the invention.

Referring now to the figure, there is shown thereon a free gyroscope, 3, fitted with the customary gimbals, 4 and 5 supported by a main frame, 2, which is rigidly attached to the hull of a torpedo, the housing of a gun turret or other device shown generally at 1, the direction of travel of which it is desired to control.

Rotation of the member 1 in a horizontal plane will serve to produce relative motion between the contact ring assembly having contact strips 14 and 15, which assembly is rigidly supported with respect to the member 1 but insulated therefrom as at 11 and the contact arm 8 which is attached to the gyro gimbal 5 by shaft 6. A locking device 7 is provided to maintain this relationship once the desired initial setting has been made by rotating arm 8 with respect to the positions of gyro wheel 3.

A connection is made from battery 12 to shaft 6 and contact 9 through brush 13. Of course, error signals can be obtained, if desired, by connecting a lead in an appropriate manner between the ungrounded terminal of battery 12, the rudder control relay 16 and the contact strips 14 and 15.

Actual course control of the member 1 is effected by the rudder in response to torque exerted by motor 20 through a worm and sector assembly as is well known in the art.

The rudder control relay shown generally at 16 which connects the gyro mechanism to the rudder control mechanism is a bridge type relay which when both coils are energized is biased in a preferred direction thereby causing the motor 20 to operate the rudder in a preferred direction so as to cause the arm 8 to swing from the position which straddles the insulating member 33 to prevent the system from stalling when the contact arm 8 straddles the insulated portion 33 and thus makes contact with both strips 14 and 15 at the same time. In the absence of the present invention when the contact arm 8 is in such a position the motor 20 would be prevented from rotating in either direction. Such stalling action is overcome by the novel construction of the relay 16. This relay is provided with normally open contacts, with the armature 32 held in a neutral position therebetween by the springs 23 when both relay windings are de-energized so that no motion is imparted to the rudder while the member 1 is on course. When the member 1 turns off course, either or both of the contact strips 14 and 15 will be connected to the battery 12 by contact 9 thus energizing one or both of the coils 21 and 22 of relay 16. Closing either of the contacts 25 and 26 selectively provides a right or left steering signal to the motor 20. Contact arm 8 straddles the contact strips 14 and 15 at the insulated portion 33. When this occurs, the bridge circuit functions because of the biasing effect produced by the novel relay construction, and steering occurs in the preferred direction.

The control relay 16 under ordinary condition operates in a conventional manner, that is, the armature 32 pivoted at 37 attempts to shorten the flux path set up by the energized relay winding, thereby closing either contact 25 or 26. Should both coils 21 and 22 be energized at the same time as a result of contact arm 8 straddling the gap 33, the flux from both coils aid when selection is desired and would normally prevent the armature 32 from moving, since the flux would be equally balanced. However, because of the unusual shape of the upper pole piece 31, the armature 32 will always engage contact 26, thus starting the control motor 20, and thereby moving the contact arm 8 away from the gap 33. When the relay operates in the preferred direction the circuit is completed through coil 22 and armature 32 will move and close contact 26. Energy from battery 27 passes through contact 26 and thence to the motor winding connected to lead 29 and returns to common lead 30. Operation of the motor through the worm and sector arrangement (not shown) positions the rudder properly to bring the torpedo or other device back on course. If the proper course is reached contact 9 at the end of arm 8 will oscillate briefly across contact strips 14 and 15 until the rudder is restored to a neutral position. The preferred direction of operation of the relay is brought about in the following manner.

The amount of flux crossing the upper gap between the pole piece 31 and the adjacent portion of the armature 32 with one coil excited is 50% of the torque required to move the armature 32 while that of each of the lower gaps at the opposite end of the armature will be 150% when the respective coils are energized. However, when both coils are energized, the pull at the lower gaps will balance out and motion will be brought about by the torque produced at the upper gap. The preferred direction selection feature of the relay 16 may be eliminated by the insertion of a switch 35 which is a double pole, double throw switch arranged to reverse the polarity of coil 21.

It is obvious that any attempt to solve this problem by making the contact 9 narrower than the insulating material 33 results in a dead spot at point 33 which produces the same undesirable condition. In normal operation when the insulated sector 33 is made wider than contact 9, the mechanism would come to rest at that point and the motor will not operate in either direction. The present invention therefore discloses a device which enables the control mechanism to seek the desired null position by the shortest possible path.

As has been previously described, the device of the instant invention may be applied to the steering mechanism of a torpedo. In such application the course is referred to the plane of rotation of a free gyro such as 3 which remains fixedly oriented in space. If it is desired that the torpedo continue on a straight east course, for example, the contact arm 8 would be mounted upon the vertical gimbal spindle 6 of the gyroscope so that the contact arm 8 would point in an easterly direction regardless of the direction in which the torpedo was traveling. However, if in the assumed example, the torpedo was actually running due east, this contact point would lie within the gap 10 between the contact strips 14 and 15 since the mechanism is permanently mounted on the torpedo hull 1 in the direction of its axis. When the torpedo turns off course either or both contact strips 14 and 15 will be connected to the battery 12 through contact 9 thus energizing one or more of the coils 21 and 22 of relay 16.

Since the relay is biased, a preferred direction such that the armature 32 will tend to close the contact 26 by virtue of the circuit to coil 22 being completed. The energy from the battery 27 passes through the contact arm 36 of the relay armature 32, and thence by way of contact 26 to the motor winding and returns through common lead 30. Operation of the motor positions the rudder to bring the torpedo back on course. As the proper course is reached contact 9 will oscillate briefly across contact strips 14 and 15 until the rudder is restored to a neutral position.

From the foregoing description, it is apparent that applicant has provided a novel relay structure and circuit arrangement therefor which connects a gyro mechanism with a rudder control mechanism to insure a referred direction of operation of the rudder at such times when the gyro mechanism has reached a dead spot in the cycle of operation.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A course control device comprising a gyroscope, direction selector assembly means including a pair of contact strips separated by insulating material forming a ring having a gap diametrically opposite said insulating material, a contact arm having an end portion for selectively contacting said strips, said contact strips and said contact arm being in a common plane, said contact arms being secured to said gyroscope, said contact strips mounted for relative rotation with respect to said contact arm, said end contact portion being of size sufficient to straddle said insulating material and concurrently therewith contacting said pair of contact strips when said end contact is adjacent said insulating material and adapted to be disposed in said gap when said end contact is in line with a desired course and without contacting said strips, translating means, bias relay control means connecting said translating means to said selector assembly, said relay including an E-shaped core having an unsymmetrical pole portion projecting between the outer legs of said core and forming a portion of the core, said unsymmetrical projecting portion being centrally located on said core and having unequal cross-sectional areas on either side of the center thereof, a pair of coils respectively arranged about the legs of said core, elongated armature means pivotally mounted between said legs, said armature having a contact carrying member, first and second contact members disposed on opposite sides of the contact carrying member and connected to said translating means, said coils being connected to said pair of contact strips, said unequal cross-sectional areas of said projecting portion being effective to urge said armature in a predetermined direction when said contact arm portion dwells in a position straddling said insulating material and engaging both contact strips.

2. A device as in claim 1 in which switching means is provided to change the polarity of one of said coils thereby unbalancing the flux effecting the motion of said armature when both coils are energized.

3. A device as in claim 1 wherein the ampere turns of said coils are equal producing a flux balance between the legs of said core, said projecting portion being effective to produce dissymmetry in the total flux in said armature means thereby biasing the armature causing it to rotate at the preferred direction when said end contact straddles said insulating material.

4. A device as in claim 1 wherein said gap in said selector assembly is disposed diametrically opposite said insulating material whereby 180° course errors are corrected.

5. A course control device comprising course stabilizing means, a direction selector assembly having mutually insulated contact strips mounted for relative rotation with respect to said stabilizing means, translating means, bias relay control means, connecting said selector assembly to said translating means, said relay including an E-shaped core member having a pair of symmetrically disposed pole pieces and an unsymmetrically shaped pole piece on the central portion of said core member, said last named pole piece projecting inwardly and transversely of said core member, a pair of coils with one each wound on the two longer legs of the core member, pivotally mounted elongated armature means normally disposed between said symmetrically disposed pole pieces and extending into adjacency to said unsymmetrical pole piece on the core member, said pivoted mounting providing free oscillation of one end of said armature between the symmetrically disposed pole pieces of said two longer core legs, said armature having a contact arm, means for normally biasing said contact arm to an open circuit position, and a plurality of contacts disposed to be selectively engaged by said contact arm, each of said coils being individually connected to one of said contact strips whereby motion of said selector assembly produces a flux unbalance in said relay producing motion of said translating means in a particular direction.

References Cited in the file of this patent

UNITED STATES PATENTS

| | | |
|---|---|---|
| 507,522 | Ayton | Oct. 31, 1893 |
| 774,693 | Peterson | Nov. 8, 1904 |
| 1,732,711 | Bodie | Oct. 22, 1929 |